April 2, 1968          F. Z. FOUSE          3,375,915

DEAD PLATE CONVEYOR FOR GLASS MACHINES

Filed Dec. 16, 1966          4 Sheets-Sheet 1

INVENTOR.
FREDERICK Z. FOUSE
BY
Norman M. Holland
ATTORNEY

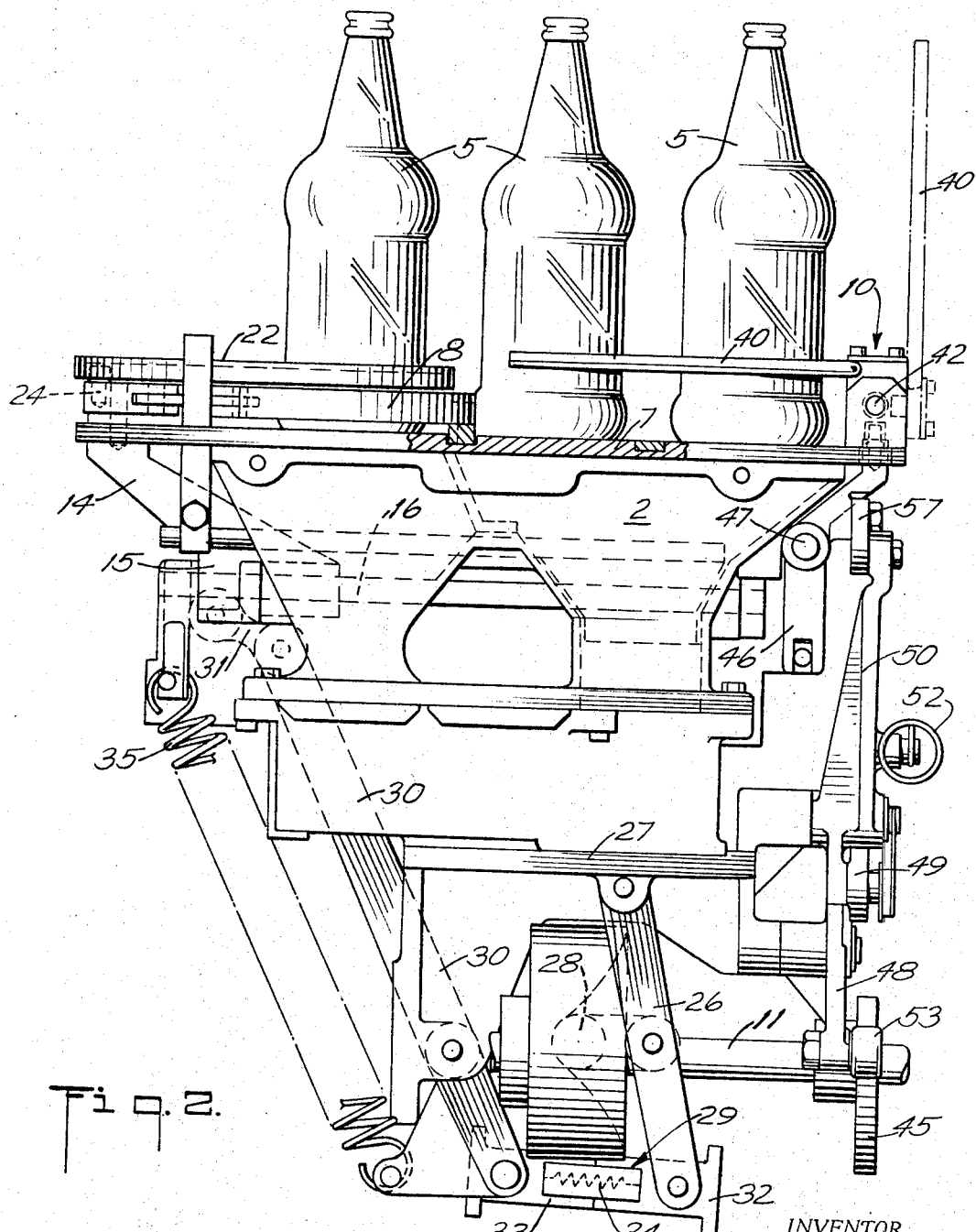

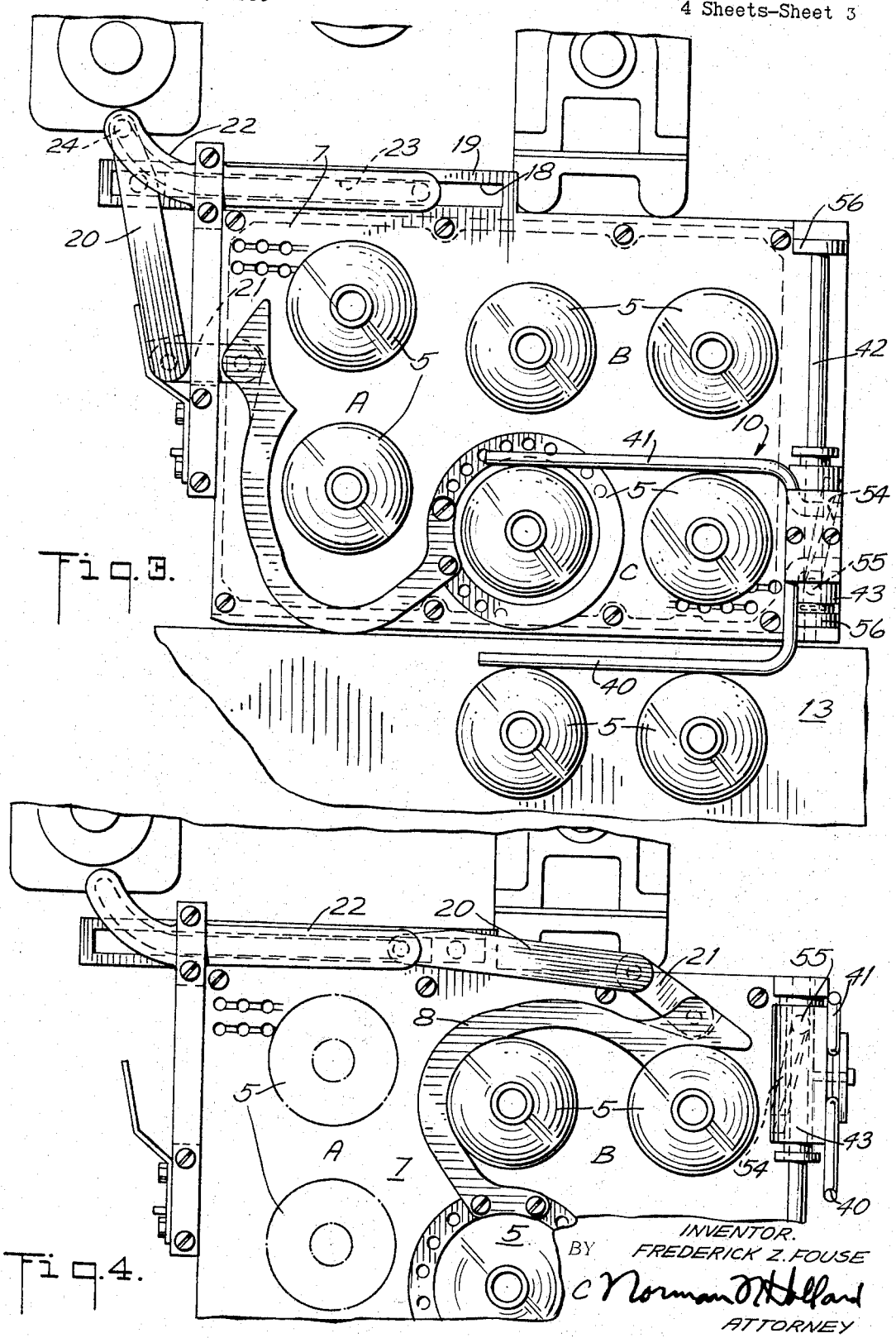

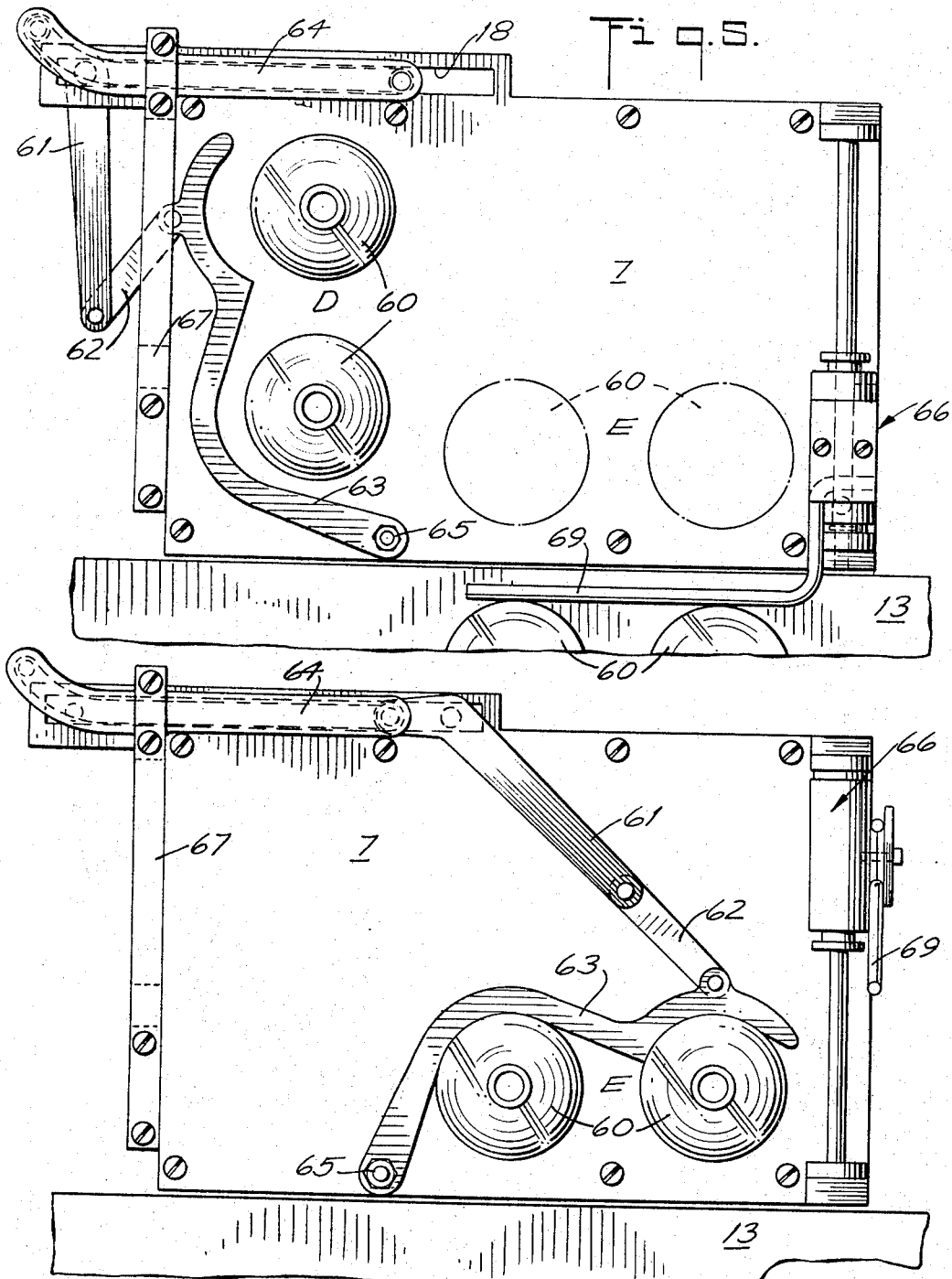

ated Apr. 2, 1968

3,375,915
DEAD PLATE CONVEYOR FOR GLASS MACHINES
Frederick Z. Fouse, Fairfield, Ohio, assignor to Anchor Hocking Glass Corporation, Lancaster, Ohio, a corporation of Delaware
Filed Dec. 16, 1966, Ser. No. 602,338
6 Claims. (Cl. 198—24)

ABSTRACT OF THE DISCLOSURE

The invention is an improved conveyor for moving hot molded glass articles along the surface of a cooling dead plate positioned between the glass forming machine and a removal conveyor and which provides a lengthened cooling period for articles without reducing the operating speed of the glass forming machinery. The article conveyor means moves the hot glassware to successive cooling positions with a dwell period at each position equal to one forming machine cycle. A total cooling period 50% greater than the normal two-cycle dwell period results for the preferred embodiment having three dwell positions. One of the movements between two dwell positions is performed by a pivoted pushover arm which moves a line of articles from a first line to a spaced line position at right angles to the first line.

---

The present invention relates to the manufacture of glassware and more particularly to an improved conveyor means for moving the completely formed glassware across a cooling dead plate.

Presently utilized machines for forming or molding glass articles such as the well-known I.S. machines include cooling plates or dead plates on which the completely formed and still hot glass articles are permitted to cool and harden prior to further treatment. In order to take advantage of the full capacity of the molding or other forming portions of the machine, the articles are moved across the dead plate in a series of movements with the molded glass articles from more than one molding cycle being on the dead plate at one time. The hot glass articles are held on the dead plate and cooled at this position so that their temperature falls to a form retaining state prior to the transfer of the completed articles to a conveyor or other handling means to thereby prevent possible deformation of the completed articles which might result if they are transferred while still warm enough to be in a plastic state.

The present improved dead plate conveyor is particularly adapted for use with machines having multiple cavity molds such as a dual cavity mold. It is clear, however, that the invention is applicable to other molding apparatus handling differing numbers of simultaneously formed articles.

The improved dead plate conveyor will be described in use with dual takeout arms which transfer molded articles, such as bottles, from a dual cavity mold in the well known I.S. machine and the illustrations and description relate to a pair of such takeout arms of the well known type for such I.S. machines which simultaneously place a pair of molded articles on a dead plate. A description of these arms and the associated I.S. machine is not necessary as the I.S. machines having dual takeout arms are well known.

The improved dead plate conveyor of the present invention provides for an increased dwell time for each article on the dead plate so that the ware placed on the dead plate has a longer period to cool and harden prior to being transferred to an annealing lehr conveyor or another conveyor. This additional cooling time is provided without decreasing the rate of operation of the forming machinery. An improved dead plate conveyor in accordance with the present invention and when used with a dual takeout means, for example, may increase the dwell or cooling period for the formed articles by as much as 50% thereby significantly reducing the chances of inadvertent article deformation. It is further seen that this improvement in dwell time removes a possible output rate limitation for the I.S. or other forming machines which might be imposed by the particular dead plate cooling time required and in machines where this time proves a limiting factor the improved conveyor permits increased forming machine operating speed.

The above advantages of reduced damage to the ware together with a possible speed increase are provided in the improved conveyor whose novel design permits advantage to be taken of substantial portions of presently used and typical dead plate conveyor mechanisms. The improved results are therefore readily obtained for existing machinery with important but relatively minor changes only being made in the operating mechanism for the dead plate conveyor.

In addition and as will be clear from the following explanation, where the increased dwell time is not advantageously used, the conveyor system may be alternatively modified to provide a shorter dwell.

Accordingly, an object of the present invention is to provide an improved cooling dead plate conveyor means for use with glass forming apparatus.

Another object of the present invention is to provide an improved dead plate conveyor providing additional dwell time for the hot glass articles without reducing the operating speed of the glass forming apparatus.

Another object of the present invention is to provide an improved dead plate conveyor providing additional article cooling time and utilizing a substantial portion of the present conventional conveyor mechanism.

Another object of the present invention is to provide a dead plate conveyor for a glass forming machine adaptable for varying cooling periods under differing operating conditions.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 2 is a front elevational view of the dead plate conveyor of FIG. 1;

FIGS. 3 and 4 are top plan views of the conveyor illustrating two successive positions of the conveyor; and FIGS. 5 and 6 are top plan views illustrating two positions of an alternate embodiment of the dead plate conveyor for short dwell periods.

Figure 1:
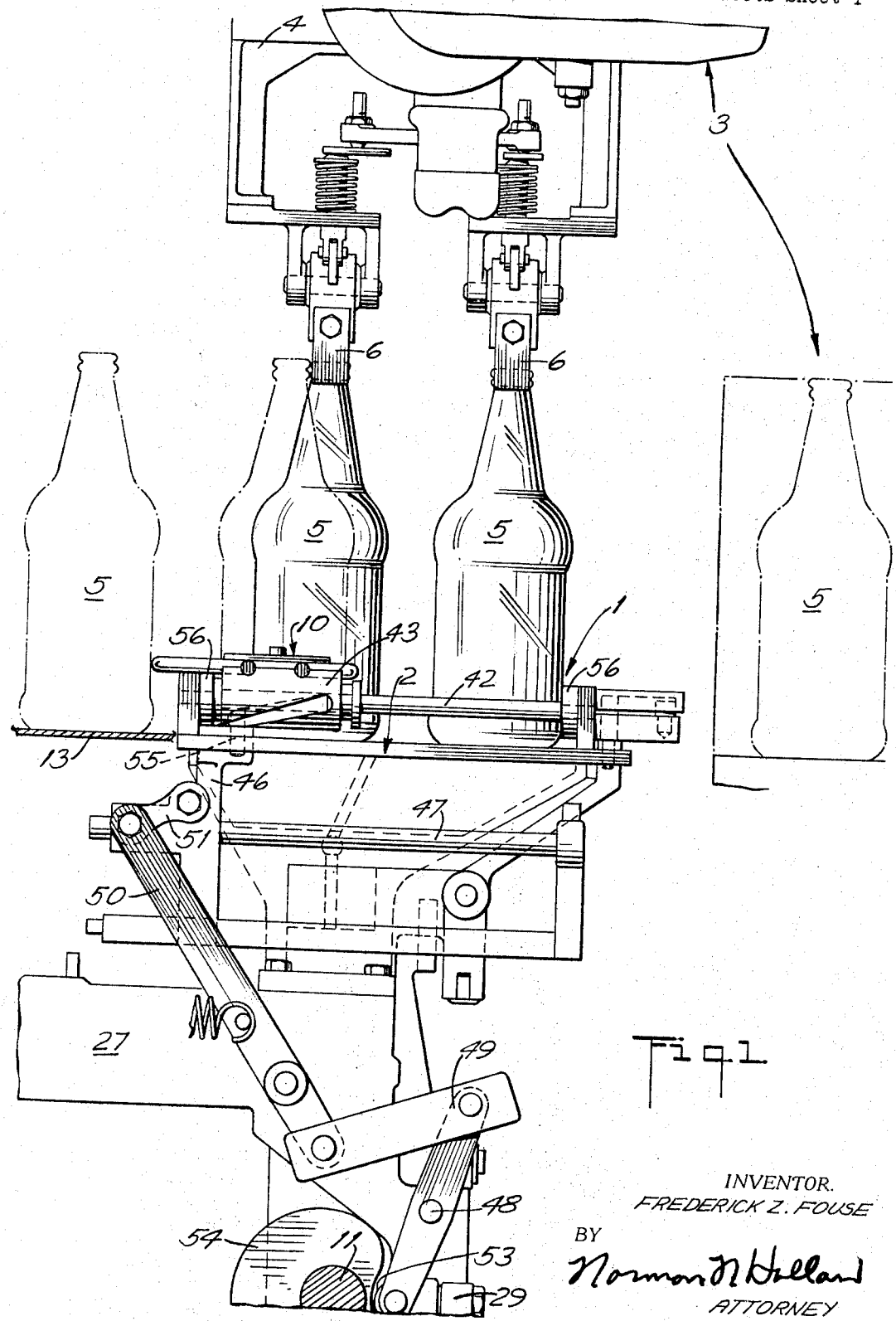
FIG. 1 is a side elevational view of a preferred embodiment of the improved dead plate conveyor in accordance with the present invention.

The conveyor 1 of the present invention operates with a dead plate 2 of conventional form and which is mounted adjacent to the glass forming machine 3 in a position so that the takeout arms 4 of the forming machine 3 release the formed articles 5 at predetermined positions on the plate 2. The articles, such as the two bottles 5, illustrated in FIG. 1, are transferred to the dead plate by takeout means such as the arms 4 illustrated in FIG. 1 and which have clamps 6 at their lower ends for releasably engaging the bottles 5. The arms 4 illustrated form no part of the present invention and the particular arms illustrated in FIG. 1 are typical of those used with the well known I.S. glass forming machines. In the position illustrated in FIG. 1, the two arms 4 are in their lowermost position having carried two bottles 5 down onto the plate 2 by a swinging motion.

The clamps 6 on these arms 4 are opened permitting the two arms 4 to be swung upwardly and away from the bottles 5 as the arms 4 move through their next cycle for subsequently positioning two additional bottles in the same position on the dead plate 2.

The dead plate 2 consists of an apertured metal top plate 7 which permits cooling air to be directed upwardly from an air chamber beneath the plate to cool and harden hot glass articles on and conveyed along the surface of the dead plate 2 by the conveyor means 1 to be further described below.

The dead plate conveyor means 1 of the present invention is provided to control the movement of the bottles 5 on the surface of the dead plate after they have been released by the transfer arms 4. The improved conveyor in accordance with the present invention moves each pair of bottles 5 to three distinct cooling positions on the dead plate 2. Each pair of bottles 5 remains in one of the three positions during an interval corresponding to a full cycle of operation of the related glass forming machine 3. Thus, as each new pair of bottles 5 is removed from the molds and is carried towards the dead plate 2, the dead plate conveyor 1 operates to simultaneously advance the bottles 5 already on the dead plate 2 to their successive positions. The three positions for the pairs of bottles 5 are illustrated in FIGS. 1 and 2. The bottles 5 are positioned initially in position A by the transfer arms 4 for the first cooling period. Thereafter, the pivoted pushover arm 8 slides these two bottles 5 to position B while the pair of bottles previously at position B are moved from position B to position C. The movement of the pair of bottles 5 from position B to the final cooling position C as well as the transfer of the bottles from position C to the final takeaway means or lehr conveyor is performed by the pushout member 10.

The synchronized drive means for the pivoted pushover arm 8 and the pushout member 10 will now be described. The preferred embodiment of the dead plate conveyor 1 in accordance with the present invention is driven from cams described below and mounted on a rotating drive shaft 11. The drive shaft 11 as illustrated in FIG. 2 may conveniently be one of the regular cam or drive shafts on the associated glass forming machinery. Typically, these drive shafts make one complete revolution for each full molding cycle so that the drive cams may be designed to provide a corresponding cycle of the dead plate conveyor.

*The pushover arm*

As already indicated, the bottles 5 are moved from their first position A on the dead plate 7 to a second cooling position B where they are aligned generally at right angles to the original position and are positioned on the back portion of the dead plate 7. The bottles 5 are moved between these two angularly aligned arrangements by the pivotally mounted pushover arm 8 which is swung between its two extreme positions as illustrated in FIGS. 3 and 4 under the control of a pushover cam 12 on cam shaft 11. The pushover arm 8 itself is generally C-shaped to provide for the necessary arcuate movement of the two bottles 5 along arcs of differing radius and lengths so that the bottles 5 themselves are moved from the original line at right angles to the takeout conveyor 13 to a new line generally parallel of the conveyor 13 and spaced on the rear portion of the dead plate 7. This swinging motion of the pushover arm 8 is controlled by a pushover slide 14 which is best illustrated in FIGS. 2 and 3. The pushover slide 14 has its bearing portion 15 slidably mounted on a rod 16 and has an upper guide portion 17 slidably contained within a guide slot 18 formed in a guide member 19 positioned at the rear of the dead plate 7. Reciprocal movement of the pushover slide 14 to and fro in the guide slot 18 under the control of the pushover cam 12 is translated to arcuate movement of the pushover arm 8 through the intermediation of a pair of pushover arm connecting links 20 and 21 pivotally attached together and to the slide 14 and the arm 8 as shown in the two positions of the pushover arm 8 illustrated in FIGS. 3 and 4.

In order to control the position of the pushover arm 8, its movement is further controlled by a path cam 22 mounted above the slide 14. The path cam 22 includes a curved cam slot 23 engaging an upwardly projecting pin 24 on the link 20 to control the link 20 position during its movement particularly at its initial and final positions during the bottle transfer stroke.

The operative coupling between the pushover cam 12 and the above described slide 14 includes pivotally attached slide drive links including a first link 26 pivotally attached to the machine frame 27 at its top and engaging the pushover cam 12 through the intermediation of a cam roller 28 mounted near its central portion. This link 26 which is rocked during the rotation of the cam 12 is coupled to the slide 14 through the intermediation of a safety link 29 and additional drive links 30 and 31. The safety link 29 is formed of two separate but slidably connected end portions 32 and 33 held together by a coil spring 34 in such a manner that the link 29 will lengthen against the force of the spring 34 in the event an obstruction is encountered anywhere in the pushover arm 8 drive system between link 29 and the pushover arm 8 itself.

A further protection is provided for the drive system which moves the pushover arm 8 by having its bottle advancing or clockwise movement in FIGS. 3 and 4 provided by a drive spring 35 which contracts during the bottle moving portion of the cycle to provide the drive force while holding the link 26 against the pushover drive cam 12.

*The article pushout member*

The bottles 5 which have been moved to the second cooling position B by the pushover arm 8 described above as well as the bottles 5 already resting in the final cooling position C are advanced simultaneously toward the conveyor 13 by the pushout member 10. As shown in FIG. 3, the pushout member 10 has two generally parallel arms 40 and 41. The rearward arm 40 moves one pair of bottles 5 from the second position B to the third cooling position C while the forward arm 41 moves the bottles 5 from the third or final position C to the takeaway conveyor 13. The pushout arms 40 and 41 are slidably mounted on a guide rod 42 at the side of the dead plate 7 on a bearing 43. This bearing 43 is reciprocated to and fro along the rod 42 to provide the above described bottle movement. On the rearward or return motion of pushout member 10, the bearing 43 and its attached arms 40 and 41 are turned about the rod 42 swinging the arms 40 and 41 to a raised position and clear of the bottles 5 to permit the return of rearward movement of the pushout member 10 without interfering with the previously positioned bottles at positions B and C.

The drive power for the movement of the pushout member 10 is provided by a pushout cam 45 mounted on the same cam shaft 11 which permits the movements of the pushover arm 8 and the pushout member 10 to be synchronized. As best illustrated in FIG. 3, the pushout cam 45 is coupled to the pushout member 10 bearing 43 through the intermediation of a bearing support bracket 46 slidably mounted on a slide rod 47. This bracket 46 is coupled to the drive cam 45 through the intermediation of pivotally connected links 48, 49, 50, and 51. As was the case with the pushover arm, the bottle moving stroke of the pushout member 10 is performed by a drive spring 52 coupled to the drive link 50 which moves the pushout member 10 through its bottle advancing stroke by holding the cam follower roller 53 on the lower link 48 against the pushout cam 45.

The upward swinging movement of the pushout member 10 bearing 43 to permit arms 40 and 41 to clear the bottles on the return stroke is provided by coupling the bearing bracket 46 to the bearing 43 through the intermediation of a curved cam slot 54 and an associated cam pin 55 on the bracket 46 as illustrated in FIG. 1. When the bearing bracket 46 is being moved rearwardly to move the pushout arm clear of the bottles and to its rearward position subsequent to a bottle moving stroke, the pin 55 is first moved rearwardly of the bearing 43 causing the bearing 43 to rotate and raise the pushout member arms 40 and 41. Only after the pin 55 reaches the rear portion of the slot 54 does the bearing 43 itself begin its rearward movement with the arms 40 and 41 swung upwardly and clear of the bottles 5. On the following forward movement of the pushout member 10 to advance the bottles 5, the bearing pin 55 will be moved forwardly in the slot 54 causing the arms 40 and 41 to be lowered into engagement with the bottles 5 before the bearing 43 itself is advanced.

In the preferred embodiment, the completion of the turning movement of the bearing 43 to raise and lower the arms 40 and 41 is facilitated by permanent magnets 56 at both ends of the rod 42. The holding forces of the magnets 56 on the bearing 43 assures movement of the pin 55 along the entire length of the bearing slot 54 prior to the movement of the bearing 43 along the rod 42.

Additional embodiments using two positions

As already indicated, the above improved dead plate conveyor 1 providing additional cooling is adaptable to existing machines and to use with cam shafts already provided on typical glass forming machines. In addition, substantially the entire mechanism may be used with minor modifications to provide for a two-position cooling operation for certain glass articles where the longer cooling is not required or where an excess amount of heat would be transferred to the dead plate in the above described three-position cooling operation.

FIGS. 5 and 6 illustrate an alternate embodiment where molded articles such as the bottles 60 shown are moved through only two positions D and E. This modification is obtained by replacing the pushover drive arm links to links 61 and 62 of differing proportions together with a differently shaped pushover arm 63 itself and a new path cam 64 and bracket 67. When these changes are made and the substituted pushover arm 63 is mounted on a differing center 65 as illustrated, the same pushover cam 12 and connecting linkage between the cam 12 and the pushover arm 8 operates to move the bottles 60 from their initial positions at D as illustrated in FIG. 3 to their next position as illustrated at E in FIG. 6. An identical pushout member 66 may be used for the final transfer of the bottles 60 from the dead plate 7 to the conveyor 13 and although double arms may be retained, it is clear that only one of these arms 69 as illustrated is required in this modification.

It is therefore clear that the improved dead plate conveyor means is not only useful for providing additional cooling in a three-position movement but that it is also adaptable for other cooling patterns such as provided by the two-position system described above.

It will be seen that an improved dead plate conveyor has been provided wherein increased cooling is provided on a relatively small dead plate and which takes advantage of already existing conveyor elements now used on typical glass forming machinery. This additional cooling is provided in a system that does not reduce the output rate of the glass forming machinery. The dead plate used with the new conveyor is only slightly larger than that required for a conventional two-position cooling pattern. As also described above, a two-position cooling cycle may be used when desirable with only minor modifications and part changes so that the improved dead plate conveyor is adaptable for varying cooling requirements.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In glassware handling apparatus for moving rows of glassware in single file and having a stationary dead plate positioned for providing a first station to which rows of articles of glassware produced by an adjacent glassware forming machine are delivered and a second station adjacent to the first to which the rows of glassware are thereafter moved from said first station and from which the rows of glassware thereafter moved onto a conveyor the improvement which comprises a transfer mechanism operable for moving a row of glassware from said first station to said second station including means for moving the individual articles along separate arcuate paths of differing lengths for positioning the articles in a row at the second station angularly positioned with respect to the row position at the first station, a third station intermediate said second station and said conveyor, and means for transferring rows of articles from the second position to the third position and then to the conveyor with the individual articles moving along straight paths.

2. The apparatus as claimed in claim 1 which further comprises said means for transferring rows of articles from the second position to the third position and then to the conveyor comprising a pair of spaced article pushing arms, and means for moving said arms clear of the articles during their return movement away from the conveyor.

3. In apparatus for handling glassware having a generally horizontal glassware removal conveyor and glass article cooling means located at one side of said conveyor and adjacent thereto for receiving successive rows of hot articles of glassware from an associated forming machine and said cooling means having successive cooling stations for cooling and hardening said rows of articles to shape-retaining condition the improvement which comprises means for transferring each row of articles after cooling period at the first station to a second station for further cooling with the row of articles oriented in an angularly aligned position to the row direction at the first station, a third station intermediate said second station and said removal conveyor, and means for transferring rows of articles from the second position to the third position and then to the conveyor with the individual articles moving along straight paths.

4. The apparatus as claimed in claim 3 which further comprises a pair of spaced pusher arms adapted for simultaneously moving rows of articles between said second and third stations and said third station and said removal conveyor.

5. The apparatus as claimed in claim 3 which comprises pusher means for transferring the row of articles from the second station to the conveyor, cam means for moving the pusher means clear of the articles as the pusher means moves away from the conveyor, and magnetic means for releasably engaging and controlling said cam means.

6. In apparatus for handling glassware having a generally horizontal glassware removal conveyor and glass article cooling means located at one side of said conveyor and adjacent thereto for receiving successive rows of hot articles of glassware from an associate forming machine and said cooling means having successive cooling stations for cooling and hardening said rows of articles to shape-retaining condition the improvement which comprises pivotally mounted means for transferring each article of the row of articles after a cooling period at the first station along an arcuate path to a second station for further cooling and with the articles oriented in a row generally at right angles with respect to the row direction at the first station and generally parallel to the direction of conveyor movement, and means for thereafter transferring the row from the second station to said movable conveyor.

References Cited

UNITED STATES PATENTS

| 2,973,608 | 3/1961 | Killion | 198—33 |
| 3,027,021 | 3/1962 | Kramer | 198—33 |
| 3,318,433 | 5/1967 | Rowe | 198—24 |

RICHARD E. AEGERTER, *Primary Examiner.*